(12) United States Patent
Chu et al.

(10) Patent No.: US 7,459,122 B2
(45) Date of Patent: Dec. 2, 2008

(54) METHODS OF FORMING ALUMINUM OXYNITRIDE-COMPRISING BODIES, INCLUDING METHODS OF FORMING A SHEET OF TRANSPARENT ARMOR

(75) Inventors: Henry Shiu-Hung Chu, Idaho Falls, ID (US); Thomas Martin Lillo, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 379 days.

(21) Appl. No.: 11/427,840

(22) Filed: Jun. 30, 2006

(65) Prior Publication Data
US 2008/0000573 A1 Jan. 3, 2008

(51) Int. Cl.
*B28B 3/00* (2006.01)
(52) U.S. Cl. .................................... 264/604
(58) Field of Classification Search ................ 264/604; 501/98.1, 98.4
See application file for complete search history.

(56) References Cited

U.S. PATENT DOCUMENTS

| | | | |
|---|---|---|---|
| 4,481,300 A | 11/1984 | Hartnett et al. | |
| 4,520,116 A | 5/1985 | Gentilman et al. | |
| 4,686,070 A | 8/1987 | Maguire et al. | |
| 4,719,187 A | 1/1988 | Bardham et al. | |
| 4,720,362 A * | 1/1988 | Gentilman et al. | 264/1.21 |
| 4,957,886 A | 9/1990 | Mathers et al. | |
| 4,990,295 A | 2/1991 | Hida | |
| 5,231,062 A * | 7/1993 | Mathers et al. | 501/96.1 |
| 5,665,450 A | 9/1997 | Day et al. | |
| 5,688,730 A * | 11/1997 | Bachelard et al. | 501/96.1 |
| 5,891,815 A * | 4/1999 | Dodds et al. | 501/96.1 |
| 5,925,584 A * | 7/1999 | Dodds et al. | 501/98.1 |
| 6,589,305 B1 | 7/2003 | Rosnflanz | |
| 7,045,091 B1 * | 5/2006 | Patel et al. | 264/654 |
| 7,309,475 B2 * | 12/2007 | Yeckley et al. | 423/385 |
| 2003/0170415 A1 | 9/2003 | Hiramatsu et al. | |
| 2004/0144244 A1 | 7/2004 | Sargent | |
| 2005/0238846 A1 | 10/2005 | Arakatsu et al. | |

OTHER PUBLICATIONS

Siddhartha Bandyopadhyay et al., *Effect of Reaction Parameters on γ-AlON Formation from $Al_2O_3$ and AlN*, J. Am. Ceram Soc., vol. 85, No. 4, pp. 1010-1012 (2002).
D. Clay et al., *Effect of $LiAl_5O_8$ additions on the sintering and optical transparency of LiAlON*, J. Euro. Ceram Soc., 12 pages (2005).

(Continued)

*Primary Examiner*—Steven P Griffin
*Assistant Examiner*—Russell J Kemmerle, III
(74) *Attorney, Agent, or Firm*—Wells St. John

(57) ABSTRACT

The invention includes methods of forming an aluminum oxynitride-comprising body. For example, a mixture is formed which comprises A:B:C in a respective molar ratio in the range of 9:3.6-6.2:0.1-1.1, where "A" is $Al_2O_3$, "B" is AlN, and "C" is a total of one or more of $B_2O_3$, $SiO_2$, Si—Al—O—N, and $TiO_2$. The mixture is sintered at a temperature of at least 1,600° C. at a pressure of no greater than 500 psia effective to form an aluminum oxynitride-comprising body which is at least internally transparent and has at least 99% maximum theoretical density.

50 Claims, 2 Drawing Sheets

OTHER PUBLICATIONS

Lucia Dumitrescu et al., *A Thermodynamic Reassessment of the Si-Al-O-N System*, J. Euro. Ceram. Soc., vol. 15, pp. 239-247 (1995).

A. Maghsoudipour et al., *Reaction sintering of AlN-AlON composites*, J. Euro. Ceram. Soc., vol. 25, pp. 1067-1072 (2005).

P. Tabary et al., *Effects of a low amount of C on the phase transformations in the AlN-$Al_2O_3$ pseudo-binary system*, J. Euro. Ceram Soc., vol. 20, pp. 1915-1921 (2000).

* cited by examiner

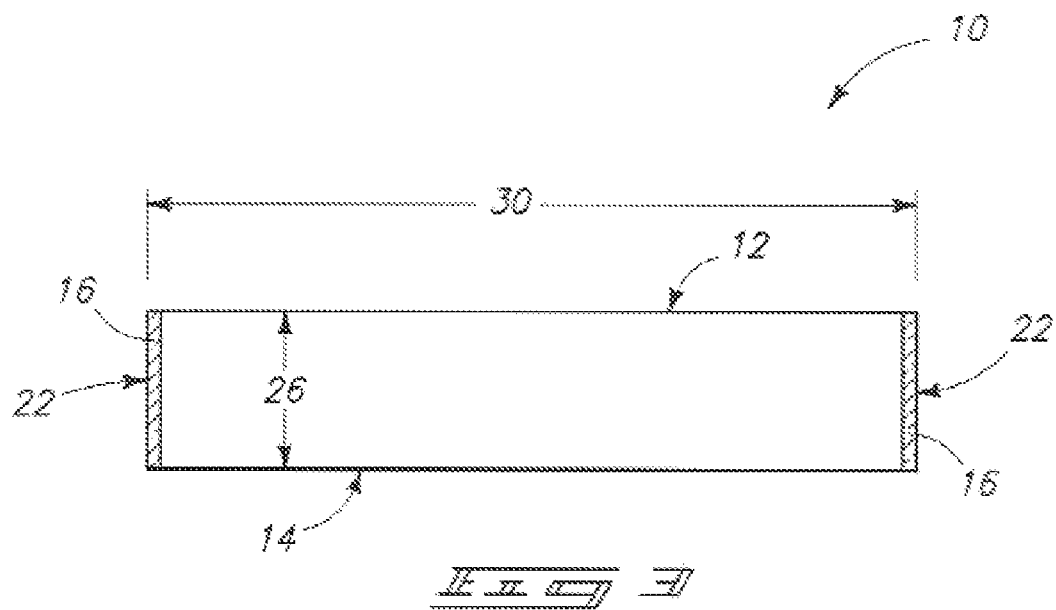
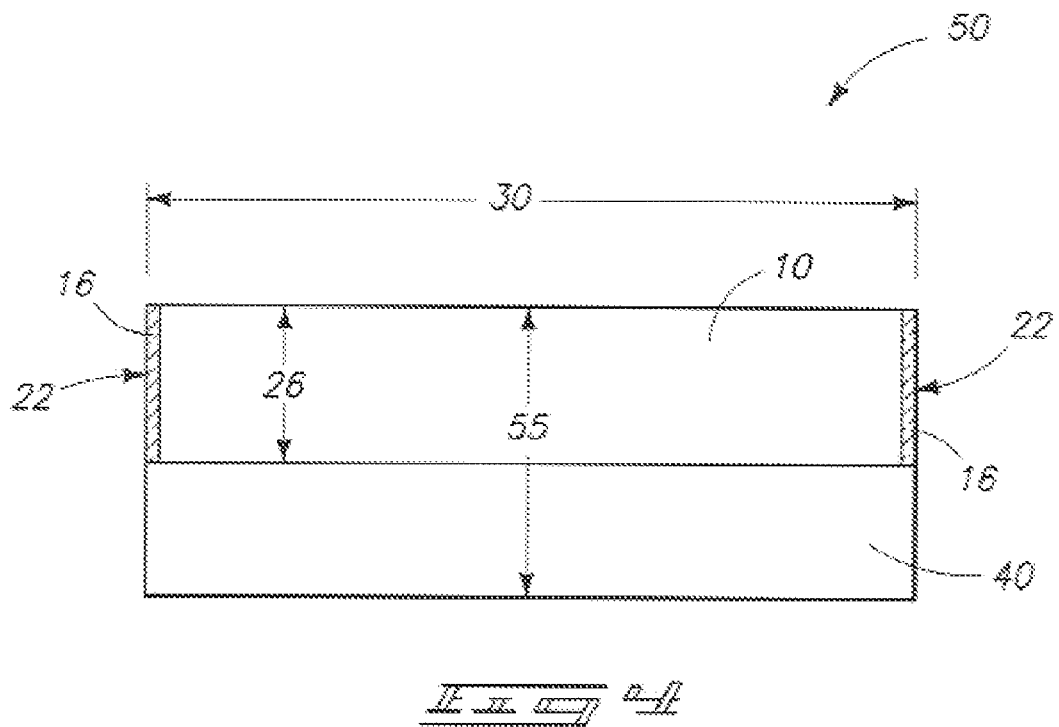

US 7,459,122 B2

METHODS OF FORMING ALUMINUM OXYNITRIDE-COMPRISING BODIES, INCLUDING METHODS OF FORMING A SHEET OF TRANSPARENT ARMOR

GOVERNMENT RIGHTS

The United States Government has certain rights in this invention pursuant to Contract No. DE-AC07-05ID14517 between the United States Department of Energy and Battelle Energy Alliance, LLC.

TECHNICAL FIELD

This invention relates to methods of forming aluminum oxynitride-comprising bodies, and to methods of forming a sheet of transparent armor.

BACKGROUND OF THE INVENTION

Aluminum oxynitride is a ceramic material that has been proposed for use in the fabrication of transparent articles such as vehicle windshields, and vehicle and building windows. Aluminum oxynitride offers the potential of a high degree of ballistic protection with a commensurate weight savings compared to traditional glass/polymer-based transparent armor. Transparent aluminum oxynitride has been shown to defeat lethal armor-piercing rounds at a fraction of the thickness and overall weight of glass/polymer laminates. However, aluminum oxynitride has not found widespread application due to the difficulty and expense of fabricating large panels for such applications as windshield and windows.

A typical present prior art process of fabricating transparent aluminum oxynitride starts with a homogeneous mixture of aluminum oxide and aluminum nitride powders. Such is mechanically milled and heated, and then mechanically sieved to form a desired aluminum oxynitride powder which, at this point, is very low in percentage of maximum theoretical density. The sieved powder is typically mixed with lubricants and binders, and then typically formed using a die and pressing apparatus into some suitable self-sustaining mass typically referred to as a green part or cold compact. The cold compact might be subsequently subjected to a hot pressing operation to provide a near-final shape of the aluminum oxynitride object that is desired. Such typically results from mechanically pressing the cold compact within a suitable die, typically at a temperature of from 800° C. to 2,000° C. The cold compact is typically at about 65% of maximum theoretical density, whereas at the conclusion of hot pressing a minimum of approximately 92% of maximum theoretical density is achieved. Consider that the hot press-final shape is somewhat limited by the nature of the mechanical pressing into a desired mold/die, and is typically conducted to create simple, very thin, substantially planar, and/or perhaps conical shaped products.

To achieve desired finished optical and ballistic product properties, 92% maximum theoretical density is typically insufficient. Therefore, the hot pressed object is subjected to hot isostatic pressing. Alternately, a cold compact without hot die/mold pressing might be directly subjected to hot isostatic pressing. Such essentially is a process whereby the object is provided into a pressure vessel that is heated to at least 1,800° C. and pressurized to an ambient internal chamber pressure typically at 20,000 psig and greater for a suitable period of time to achieve 99% or greater of maximum theoretical density. There is considerable cost and risk associated with such high pressure vessels, and the engineering and cost considerations become prohibitive for the creation of large aluminum oxynitride objects.

While the invention was motivated in addressing the above identified issues, it is in no way so limited. The invention is only limited by the accompanying claims as literally worded, without interpretive or other limiting reference to the specification, and in accordance with the doctrine of equivalents.

SUMMARY

The invention includes methods of forming an aluminum oxynitride-comprising body. For example, a mixture is formed which comprises A:B:C in a respective molar ratio in the range of 9:3.6-6.2:0.1-1.1, where "A" is $Al_2O_3$, "B" is AlN, and "C" is a total of one or more of $B_2O_3$, $SiO_2$, Si—Al—O—N, and $TiO_2$. The mixture is sintered at a temperature of at least 1,600° C. at a pressure of no greater than 500 psia effective to form an aluminum oxynitride-comprising body which is at least internally transparent and has at least 99% maximum theoretical density.

BRIEF DESCRIPTION OF THE DRAWINGS

Preferred embodiments of the invention are described below with reference to the following accompanying drawings.

FIG. 3 is a view of the FIG. 2 body at a processing step subsequent to that shown by FIG. 2.

FIG. 4 is a view of the FIG. 3 body at a processing step subsequent to that shown by FIG. 3.

DETAILED DESCRIPTION OF THE PREFERRED EMBODIMENTS

Figure 1:
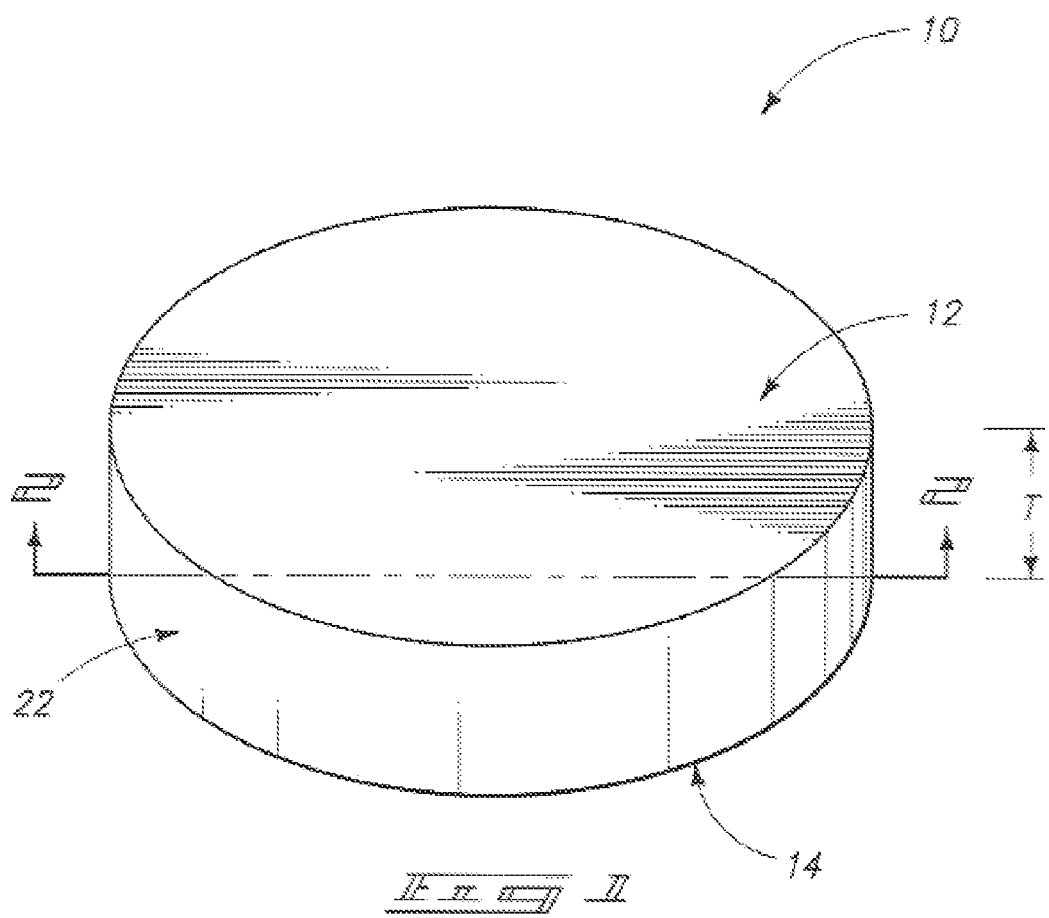
FIG. 1 is a diagrammatic perspective view of a mixture, mass, or body in accordance with an aspect of the invention.

This disclosure of the invention is submitted in furtherance of the constitutional purposes of the U.S. Patent Laws "to promote the progress of science and useful arts" (Article 1, Section 8).

Aspects of the invention encompass methods of forming an aluminum oxynitride-comprising body. In one exemplary implementation, a mixture is formed which comprises A:B:C in a respective molar ratio in the range of 9:3.6-6.2:0.1-1.1, where "A" is $Al_2O_3$, "B" is AlN, and "C" is a total of one or more of $B_2O_3$, $SiO_2$, Si—Al—O—N, and $TiO_2$. For example, the mixture might be formed to comprise only one of $B_2O_3$, $SiO_2$, Si—Al—O—N, or $TiO_2$, or might be formed to have at least two of such materials. Regardless, the mixture might comprise other materials as long as the A:B:C materials are present in the respective ratio range relative to one another as just so stated. Alternately but less typical, the mixture might consist essentially of, or consist of, A:B:C. Preferably and more typically, the mixture at least after initial preparation and prior to sintering will also comprise suitable binders, alcohol, dispersants, and/or other media, which will by way of example only be exemplified below. Regardless, alternate more preferred respective molar ratio ranges in the mixture are 9:4.5-5.5:0.1-1.1; 9:3.6-6.2:0.4-0.6; and 9:4.5-5.5:0.4-0.6.

Regardless, the mixture is sintered at a temperature of at least 1,600° C. at a pressure of no greater than 500 psia effective to form an aluminum oxynitride-comprising body which is at least internally transparent and has at least 99% maximum theoretical density. In the context of this document, "transparent" or "transparency" requires that material be transmissive of at least 80% of radiation at 0.2 micron to 4.0 microns wavelength along a shortest possible straight line extending through the material with the only possible following exception: "internally transparent" requires that material received no less than 5 mm inside of outermost surfaces of a mass of the material (whether mixture, body, sheet, or otherwise) be "transparent". Accordingly, a mass of material that is "internally transparent" may or may not have one or more non-transparent outermost regions that is/are not thicker than 5 mm. In the context of this document, "maximum theoretical density" refers to that of 100% pure aluminum oxynitride of $Al_{23}O_{27}N_5$ composition, and which has historically been determined to be 3.71 gms/cm$^3$, and is used regardless of whether the aluminum oxynitride-comprising material referred to is of such 23:7:5 molar fractions.

The sintering is most preferably conducted in an isostatic manner, and in an inert or non-inert atmosphere. One exemplary non-inert atmosphere comprises $O_2$ and, for example, includes ambient room air composition. In one preferred implementation, a preferred upper temperature limit during the sintering is 2,100° C. With respect to pressure, such sintering is preferably conducted at no greater than 200 psia, more preferably at no greater than 50 psia, and even more preferably at no greater than 30 psia. A non-limiting preferred reason for operating at lower pressures is to avoid costs, complexity, and throughput issues associated with high pressure isostatic pressing equipment and methods of the prior art to achieve high maximum theoretical densities. A more preferred sintering pressure is from 13 psia to 20 psia, with a most preferred sintering pressure being one that is greater than room ambient pressure by no more than 10 psig. Aspects of the invention also comprise sintering at pressures which are subatmospheric, even for example as low as 0.1 mTorr. Subatmospheric sintering, particularly at very low vacuum-like pressures, is less desirable and, again, likely to lead to higher equipment and manufacturing costs.

In one preferred implementation, the mixture is provided to have a density at least immediately prior to such sintering that is at least 55% maximum theoretical density. In one preferred implementation, the mixture and sintering are effective to form the aluminum oxynitride-comprising body to comprise $Al_{23}O_{27}N_5$, and in one implementation to consist essentially of $Al_{23}O_{27}N_5$. Accordingly, the material might comprise an aluminum oxynitride-comprising material other than $Al_{23}O_{27}N_5$, and regardless of whether additional materials are present in the finished body, yet achieving at least 99% maximum theoretical density of a body that would consist essentially of $Al_{23}O_{27}N_5$. Regardless, preferably the sintering is effective to form the aluminum oxynitride-comprising body to have at least 99.5%, and even more preferably at least 99.9%, maximum theoretical density.

Typically and preferably, the mixture is formed into some mass of desired shape prior to the stated sintering action. By way of example only, such mass might result from cold isostatically pressing the mixture prior to such sintering, or alternately/additionally form the mass from some other existing or yet-to-be developed method or methods. In one preferred implementation, the mass of desired shape and the resultant body comprise a sheet. Further and regardless, in one implementation the preferred mass is formed to have a maximum outer surface dimension of at least 40 inches.

FIG. 1 depicts an exemplary mixture as stated above which has been formed into a mass 10 as might be considered in either a pre-sintered or post-sintered depiction. Regardless, such is exemplary only and depicted in the form of a simple disc or sheet having opposing major surfaces 12, 14, outermost lateral surfaces 22, and of some suitable thickness T. Major surfaces 12 and 14 are depicted as being flat. Alternately by way of example only, such might be concave, convex, undulating, or of any other configuration whether existing or yet-to-be developed. Major surfaces 12 and 14 are also depicted for ease of description as being circular, but of course might be of rectangular, triangular, or any other desired shape or shapes. Further by way of example only, such mass might be configured in any conceivable or yet-to-be developed shapes including arms, indentations, projections, etc. of some preferred general desired finished configuration prior to the preferred sintering as described herein.

Figure 2:
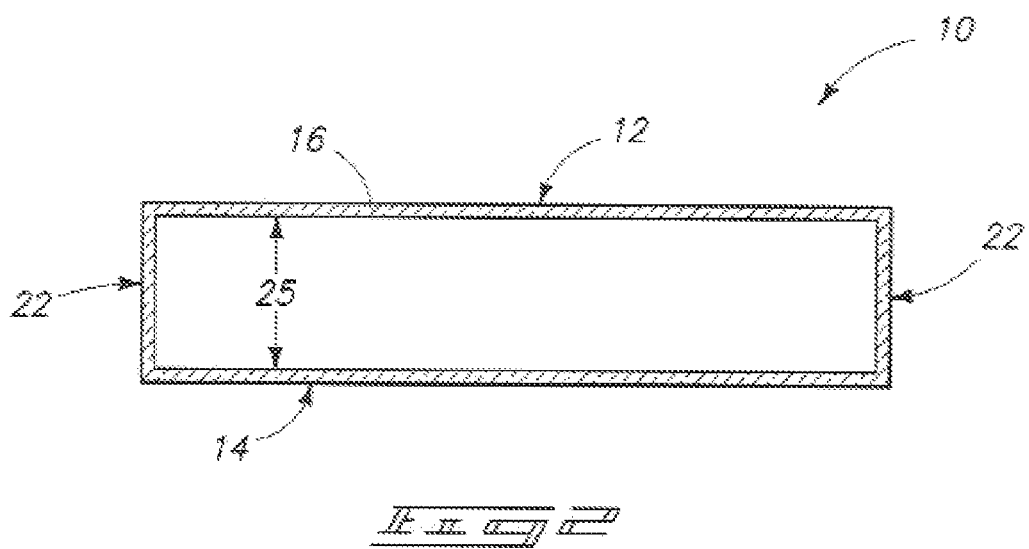
FIG. 2 is a cross section of a body of FIG. 1 taken through line 2-2 in FIG. 1.

Referring to FIG. 2, mass 10 is depicted after sintering at a temperature of least 1,600° C. and at a pressure of no greater than 500 psia effective to form an aluminum oxynitride-comprising body 10 which is at least internally transparent and has at least 99% maximum theoretical density. By way of example only, such mass might be formed to be transparent or only internally transparent. FIG. 2 depicts sintering the mass effective to form body 10 to have some non-transparent outer region 16 that is no greater than 5 mm thick from outermost surfaces 12, 14 of body 10. Preferably, outer region 16 is no greater than 5 mm thick, and even more preferably not greater than 1 mm thick, from outermost surfaces 12, 14. In the depicted exemplary preferred embodiment, body 10 is formed to have such non-transparent outer region 16 encompassing all outermost surfaces of the body including side surfaces. Alternately and by way of example only, not all of the outermost surfaces might comprise such non-transparent outer region, with one or more isolated non-transparent outer regions forming or perhaps no such non-transparent outer region(s) forming. FIG. 2, by way of example only, depicts a shortest-possible line 25 along which body 10 is internally transparent, and with body 10 comprising at least two opposing outer surfaces 12, 14 which are not transparent at least due to region(s) 16. Further, outer region 16 adjacent or proximate outer surface 12 can be considered as comprising an opposing non-transparent outer region to that of outer region 16 proximate or adjacent outer surface 14 regardless of whether the depicted outermost lateral surfaces 22 are non-transparent.

In one preferred implementation, the two opposing outer surfaces are suitably polished (i.e., chemically, mechanically, and/or a combination of chemically and mechanically) to render the body transparent through the two opposing outer surfaces. FIG. 3, by way of example only, depicts body/sheet 10 wherein opposing major outermost surfaces 12, 14 have been polished effective to remove non-transparent region 16 therefrom. Accordingly, the depicted exemplary body 10 is transparent along a line 26 which may, by way of example only, be the same or smaller in length than exemplary line 25 in FIG. 2 as a result of the polishing action. In one preferred implementation, sheet 10 is formed to have some minimum major dimension 30 which is at least 40 inches.

Aspects of the invention encompass or include a method of forming a sheet of transparent ceramic armor with sheet 10 in FIG. 3 depicting such an exemplary body which might constitute a sheet of transparent ceramic armor, and whether used alone or in combination with other materials, coatings, and/or components. For example and by way of example only, polished sheet 10 of FIG. 3 might be bonded to/with another sheet. Most preferably in such instance, a composite body of the bonded sheets will be transparent. FIG. 4, by way of example only, depicts polished sheet 10 bonded to another sheet 40, thus forming an exemplary composite body 50. An exemplary preferred material for sheet 40 is polycarbonate, which also is preferably transparent. Such can be bonded with polished sheet 10 using any suitable commercial grade clear polyurethane that preferably cures at room temperature or elevated temperature. The bond faces can be prepared by cleaning repeatedly and thoroughly with alcohol. Slight clamping pressure can be employed towards achieving an evenly distributed adhesive and a bond line of preferably no more than 0.020 inch, with the bonded components preferably being allowed to cure for at least 24 hours. Such preferably forms exemplary composite body 50 to be transparent along exemplary shortest-possible line 55.

EXAMPLE 1

A:B:C=9.0:5.0:0.5, where C is $B_2O_3$

Materials combined into a mixture include 917.6 grams $Al_2O_3$ powder, 205.0 grams AlN powder, 37.9 grams $B_2O_3$ powder, 34.8 grams of liquid RhoPlex B-60A emulsion, 15.5 grams of PVP (K-15), and 348.0 grams of ethanol. RhoPlex B-60A emulsion is available from Rohm & Haas Co. of Philadelphia, Pa. PVP (K-15) is a dispersant available from International Specialty Products of Wayne, N.J. The stated mixture components are milled together for 24 hours in a 2,000 $cm^3$ urethane-lined ball mill with 3 kilograms of high purity (greater than 99%) alumina balls having an average diameter of from ⅜ to ½ inch. The milled mixture is dried at 50° C. for 24 hours in room ambient. The resultant dried product is crushed and sieved through a 60 mesh sieve. The sieved mixture is uniaxially pressed at room ambient temperature into green samples or sheets of desired size and shape in a die at 7,000 psig. The binder is substantially burned-out at 450° C. for 4 hours in air. The resultant compacts are sintered isostatically at 1,750° C. for 1 hour in air at 18-20 psia. The sintered compact bodies/sheets are cooled at a rate of 10° C./minute. The bodies/sheets are internally transparent, having opposing surfaces comprised of non-transparent regions which are less than 0.5 mm thick.

The opposing surfaces of the sheet/body are polished according to the following sequence:
a) grinding on a rotating wheel fitted with a 9 micron diamond film for 5 minutes;
b) grinding on a rotating wheel fitted with a 6 micron diamond film for 10 minutes;
c) grinding on a rotating wheel fitted with a 3 micron diamond film for 45 minutes;
d) grinding on a rotating wheel fitted with a cloth saturated with a slurry of 0.3 micron $Al_2O_3$ for 5 minutes (i.e., using Micro Polish II made by Buehler Co. of Lake Bluff, Ill., which is mixed with water to form a slurry of 5% alumina by weight); and
e) grinding on a rotating wheel fitted with a cloth saturated with a slurry of 0.05 micron $Al_2O_3$ for 5 minutes (i.e., using Micro Polishing B-0.05 micron alumina made by Buehler Co. of Lake Bluff, Ill., which is mixed with water to form a slurry of 5% alumina by weight).

The non-transparent outermost regions are removed by such polishing actions, leaving transparent bodies/sheets.

EXAMPLE 2

A:B:C=9.0:6.0:1.1, where C is $TiO_2$

Materials combined into a mixture include 917.6 grams $Al_2O_3$ powder, 245.9 grams AlN powder, 87.9 grams $TiO_2$ powder, 37.5 grams of QPAC as a binder, 15.5 grams of PVP (K-15), and 1000.0 grams of acetone. QPAC is available from Empower Materials of Newark, Del. The stated mixture components are milled together for 24 hours in a 8,600 $cm^3$ urethane-lined ball mill with 12 kilograms of high purity (greater than 99%) alumina balls having an average diameter of from ⅜ to ½ inch. The milled mixture is dried at 50° C. for 24 hours in room ambient. The resultant dried product is crushed and sieved through a 60 mesh sieve. The sieved mixture is cold isostatically pressed in liquid at room ambient temperature at 30,000 psig in evacuated and sealed bags. The binder is substantially burned-out at 300° C. for 4 hours in air. The resultant compacts are sintered isostatically at 1,850° C. for 1 hour in a flowing nitrogen ambient at 18-20 psia. The sintered compact bodies/sheets are cooled at a rate of 10° C./minute. The bodies/sheets are internally transparent, having opposing surfaces comprised of non-transparent regions which are less than 0.5 mm thick.

The opposing surfaces of the sheet/body are polished according to the following sequence:
a) grinding on a rotating wheel fitted with a 9 micron diamond film for 5 minutes;
b) grinding on a rotating wheel fitted with a 6 micron diamond film for 10 minutes;
c) grinding on a rotating wheel fitted with a 3 micron diamond film for 45 minutes;
d) grinding on a rotating wheel fitted with a cloth saturated with a slurry of 0.3 micron $Al_2O_3$ for 5 minutes (i.e., using Micro Polish II made by Buehler Co. of Lake Bluff, Ill., which is mixed with water to form a slurry of 5% alumina by weight); and
e) grinding on a rotating wheel fitted with a cloth saturated with a slurry of 0.05 micron $Al_2O_3$ for 5 minutes (i.e., using Micro Polishing B-0.05 micron alumina made by Buehler Co. of Lake Bluff, Ill., which is mixed with water to form a slurry of 5% alumina by weight).

The non-transparent outermost regions are removed by such polishing actions, leaving transparent bodies/sheets.

EXAMPLE 3

A:B:C=9.0:3.8:0.1, where C is $SiO_2$

Materials combined into a mixture include 917.6 grams $Al_2O_3$ powder, 155.8 grams AlN powder, 6.0 grams $SiO_2$ powder, 32.4 grams of B60A, 15.5 grams of PVP (K-15), and 517.6 grams of ethanol. The stated mixture components are milled together for 24 hours in a 6,000 $cm^3$ urethane-lined ball mill with 8 kilograms of high purity (greater than 99%) alumina balls having an average diameter of from ⅜ to ½ inch. The milled mixture is dried at 50° C. for 24 hours in room ambient. The resultant dried product is crushed and sieved through a 60 mesh sieve. The sieved mixture is cold isostatically pressed in liquid at room ambient temperature at 30,000 psig in evacuated and sealed bags. The binder is substantially burned-out at 450° C. for 4 hours in air. The resultant compacts are sintered isostatically at 1,725° C. for 1 hour in a flowing nitrogen ambient at 18-psia. The sintered compact bodies/sheets are cooled at a rate of 10° C./minute. The bodies/sheets are internally transparent, having opposing surfaces comprised of non-transparent regions which are less than 0.5 mm thick.

The opposing surfaces of the sheet/body are polished according to the following sequence:
a) grinding on a rotating wheel fitted with a 9 micron diamond film for 5 minutes;
b) grinding on a rotating wheel fitted with a 6 micron diamond film for 10 minutes;
c) grinding on a rotating wheel fitted with a 3 micron diamond film for 45 minutes;

d) grinding on a rotating wheel fitted with a cloth saturated with a slurry of 0.3 micron $Al_2O_3$ for 5 minutes (i.e., using Micro Polish II made by Buehler Co. of Lake Bluff, Ill., which is mixed with water to form a slurry of 5% alumina by weight); and e) grinding on a rotating wheel fitted with a cloth saturated with a slurry of 0.05 micron $Al_2O_3$ for 5 minutes (i.e., using Micro Polishing B-0.05 micron alumina made by Buehler Co. of Lake Bluff, Ill., which is mixed with water to form a slurry of 5% alumina by weight).

The non-transparent outermost regions are removed by such polishing actions, leaving transparent bodies/sheets.

EXAMPLE 4

A:B:C=9.0:5.0:0.5, where C is Si—Al—O—N ($Si_3Al_3O_3N_5$)

Materials combined into a mixture include 917.6 grams $Al_2O_3$ powder, 205.0 grams AlN powder, 142.5 grams Si—Al—O—N powder, 37.9 grams of B60A, 15.5 grams of PVP (K-15), and 621.2 grams of ethanol. Si—Al—O—N is available from Reade Advanced Materials of Reno, Nev. The stated mixture components are milled together for 24 hours in a 7,500 cm³ urethane-lined ball mill with 10.5 kilograms of high purity (greater than 99%) alumina balls having an average diameter of from ⅜ to ½ inch. The milled mixture is dried at 50° C. for 24 hours in room ambient. The resultant dried product is crushed and sieved through a 60 mesh sieve. The sieved mixture is cold isostatically pressed in liquid at room ambient temperature at 30,000 psig in evacuated and sealed bags. The binder is substantially burned-out at 450° C. for 4 hours in air. The resultant compacts are sintered isostatically at 1,850° C. for 1 hour in a flowing nitrogen ambient at 18-psia. The sintered compact bodies/sheets are cooled at a rate of 10° C./minute. The bodies/sheets are internally transparent, having opposing surfaces comprised of non-transparent regions which are less than 0.5 mm thick.

The opposing surfaces of the sheet/body are polished according to the following sequence:

a) grinding on a rotating wheel fitted with a 9 micron diamond film for 5 minutes;

b) grinding on a rotating wheel fitted with a 6 micron diamond film for 10 minutes;

c) grinding on a rotating wheel fitted with a 3 micron diamond film for 45 minutes;

d) grinding on a rotating wheel fitted with a cloth saturated with a slurry of 0.3 micron $Al_2O_3$ for 5 minutes (i.e., using Micro Polish II made by Buehler Co. of Lake Bluff, Ill., which is mixed with water to form a slurry of 5% alumina by weight); and e) grinding on a rotating wheel fitted with a cloth saturated with a slurry of 0.05 micron $Al_2O_3$ for 5 minutes (i.e., using Micro Polishing B-0.05 micron alumina made by Buehler Co. of Lake Bluff, Ill., which is mixed with water to form a slurry of 5% alumina by weight).

The non-transparent outermost regions are removed by such polishing actions, leaving transparent bodies/sheets.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of forming an aluminum oxynitride-comprising body, comprising:

forming a mixture comprising A:B:C in a respective molar ratio in the range of 9:3.6-6.2:0.1-1.1, where "A" is $Al_2O_3$, "B" is AlN, and "C" is a total of one or more of $B_2O_3$, $SiO_2$, Si—Al—O—N, and $TiO_2$; and sintering the mixture at a temperature of at least 1,600° C., at a pressure of no greater than 500 psia effective to form an aluminum oxynitride-comprising body which is at least internally transparent and has at least 99% maximum theoretical density.

2. The method of claim 1 comprising sintering at a pressure no greater than 200 psia.

3. The method of claim 2 comprising sintering at a pressure no greater than 50 psia.

4. The method of claim 3 comprising sintering at a pressure no greater than 30 psia.

5. The method of claim 4 comprising sintering at a pressure which is greater than room ambient pressure by no more than 10 psig.

6. The method of claim 4 comprising sintering at a pressure which is subatmospheric.

7. The method of claim 1 comprising sintering in an atmosphere which is inert.

8. The method of claim 1 comprising sintering in an atmosphere comprising $O_2$.

9. The method of claim 1 wherein the sintering is isostatic.

10. The method of claim 1 comprising cold isostatically pressing the mixture prior to said sintering.

11. The method of claim 1 comprising forming the mixture into a mass of desired shape prior to said sintering.

12. The method of claim 11 comprising sintering the mass effective to form the body to have some non-transparent outer region that is no greater than 5 mm thick from an outermost surface of said body.

13. The method of claim 12 wherein said body is formed to have such non-transparent outer region at all outermost surfaces of said body.

14. The method of claim 1 comprising providing the mixture to have a density immediately prior to said sintering that is at least 55% maximum theoretical density.

15. The method of claim 1 comprising forming the mixture to have an A:B:C respective molar ratio in the range of 9:4.5-5.5:0.1-1.1.

16. The method of claim 1 comprising forming the mixture to have an A:B:C respective molar ratio in the range of 9:3.6-6.2:0.4-0.6.

17. The method of claim 1 comprising forming the mixture to have an A:B:C respective molar ratio in the range of 9:4.5-5.5:0.4-0.6.

18. The method of claim 1 comprising forming the mixture to comprise at least two of $B_2O_3$, $SiO_2$, Si—Al—O—N, and $TiO_2$.

19. The method of claim 1 comprising forming the mixture to comprise only one of $B_2O_3$, $SiO_2$, Si—Al—O—N, and $TiO_2$.

20. The method of claim 1 comprising forming the mixture to comprise $B_2O_3$.

21. The method of claim 1 comprising forming the mixture to comprise $SiO_2$.

22. The method of claim 1 comprising forming the mixture to comprise Si—Al—O—N.

23. The method of claim 1 comprising forming the mixture to comprise $TiO_2$.

24. The method of claim 1 wherein the mixture and sintering are effective to form the aluminum oxynitride-comprising body to comprise $Al_{23}O_{27}N_5$.

25. The method of claim 1 wherein the mixture and sintering are effective to form the aluminum oxynitride-comprising body to consist essentially of $Al_{23}O_{27}N_5$.

26. A method of forming an aluminum oxynitride-comprising body, comprising:
   forming a mixture comprising A:B:C in a respective molar ratio in the range of 9:3.6-6.2:0.1-1.1, where "A" is $Al_2O_3$, "B" is AlN, and "C" is a total of one or more of $B_2O_3$, $SiO_2$, Si—Al—O—N, and $TiO_2$;
   forming the mixture into a mass of desired shape having density that is at least 55% maximum theoretical density; and
   isostatically sintering the mass at a temperature of at least 1,600° C., at a pressure of no greater than 20 psia effective to form an aluminum oxynitride-comprising body which is at least internally transparent and has at least 99% maximum theoretical density.

27. The method of claim 26 comprising forming the mixture to have an A:B:C respective molar ratio in the range of 9:4.5-5.5:0.1-1.1.

28. The method of claim 26 comprising forming the mixture to have an A:B:C respective molar ratio in the range of 9:3.6-6.2:0.4-0.6.

29. The method of claim 26 comprising forming the mixture to have an A:B:C respective molar ratio in the range of 9:4.5-5.5:0.4-0.6.

30. The method of claim 26 comprising forming the mass to have a maximum outer surface dimension of at least 40 inches.

31. A method of forming a transparent aluminum oxynitride-comprising body, comprising:
   forming a mixture comprising A:B:C in a respective molar ratio in the range of 9:3.6-6.2:0.1-1.1, where "A" is $Al_2O_3$, "B" is AlN, and "C" is a total of one or more of $B_2O_3$, $SiO_2$, Si—Al—O—N, and $TiO_2$;
   forming the mixture into a mass of desired shape;
   sintering the mass at a temperature of at least 1,600° C., at a pressure of no greater than 500 psia effective to transform the mass into an aluminum oxynitride-comprising body which is at least 99% maximum theoretical density, which is internally transparent, and which comprises at least two opposing outer surfaces which are not transparent; and
   polishing the two opposing outer surfaces to render the body transparent through the two opposing outer surfaces.

32. The method of claim 31 wherein the mass of desired shape and the body comprise a sheet, and said surfaces which are polished comprise major surfaces of the sheet.

33. The method of claim 31 comprising sintering effective to form the aluminum oxynitride-comprising body to have at least 99.5% maximum theoretical density.

34. The method of claim 33 comprising sintering effective to form the aluminum oxynitride-comprising body to have at least 99.9% maximum theoretical density.

35. The method of claim 31 comprising sintering the mass effective to form the body to have opposing non-transparent outer regions adjacent said respective opposing outer surfaces that are no greater than 5 mm thick from said respective of the two opposing outer surfaces.

36. The method of claim 35 wherein the opposing non-transparent outer regions are no greater than 1 mm thick from said respective of the two opposing outer surfaces.

37. The method of claim 31 comprising sintering at a pressure no greater than 30 psia.

38. The method of claim 37 comprising sintering at a pressure from 13 psia to 20 psia.

39. The method of claim 31 comprising providing the mixture to have a density immediately prior to said sintering that is at least 55% maximum theoretical density.

40. The method of claim 39 comprising sintering at a pressure from 13 psia to 20 psia.

41. A method of forming a sheet of transparent ceramic armor, comprising:
   forming a mixture comprising A:B:C in a respective molar ratio in the range of 9:3.6-6.2:0.1-1.1, where "A" is $Al_2O_3$, "B" is AlN, and "C" is a total of one or more of $B_2O_3$, $SiO_2$, Si—Al—O—N, and $TiO_2$;
   forming the mixture into a sheet;
   isostatically sintering the sheet at a temperature of at least 1,600° C., at a pressure of no greater than 500 psia effective to form an aluminum oxynitride-comprising sheet which is at least 99% maximum theoretical density, which is internally transparent, and which comprises two opposing major outer sheet surfaces which are not transparent; and
   polishing the two opposing major outer sheet surfaces to render the sheet transparent through the two opposing major outer sheet surfaces.

42. The method of claim 41 comprising sintering effective to form the aluminum oxynitride-comprising sheet to have at least 99.5% maximum theoretical density.

43. The method of claim 41 comprising sintering at a pressure no greater than 30 psia.

44. The method of claim 43 comprising sintering at a pressure from 13 psia to 20 psia.

45. The method of claim 41 comprising providing the mixture to have a density immediately prior to said sintering that is at least 55% maximum theoretical density.

46. The method of claim 45 comprising sintering at a pressure from 13 psia to 20 psia.

47. The method of claim 41 comprising forming the sheet to have a minimum major dimension of at least 40 inches.

48. The method of claim 41 comprising bonding the polished sheet to another sheet.

49. The method of claim 41 comprising bonding the polished sheet to a sheet comprising polycarbonate.

50. The method of claim 49 wherein the polycarbonate-comprising sheet is transparent, and a composite body of the bonded sheets is transparent.

* * * * *